US012576618B2

(12) United States Patent
Nohara et al.

(10) Patent No.: US 12,576,618 B2
(45) Date of Patent: Mar. 17, 2026

(54) DISPERSION, RESIN COMPOSITION, INTERMEDIATE FILM FOR LAMINATED GLASS, AND LAMINATED GLASS

(71) Applicants: SEKISUI CHEMICAL CO., LTD., Osaka (JP); Mitsubishi Materials Electronic Chemicals Co., Ltd., Akita (JP)

(72) Inventors: Atsushi Nohara, Shiga (JP); Eri Asano, Akita (JP)

(73) Assignees: SEKISUI CHEMICAL CO., LTD., Osaka (JP); MITSUBISHI MATERIALS ELECTRONIC CHEMICALS CO., LTD., Akita (JP)

( * ) Notice: Subject to any disclaimer, the term of this patent is extended or adjusted under 35 U.S.C. 154(b) by 306 days.

(21) Appl. No.: 18/562,045

(22) PCT Filed: May 17, 2022

(86) PCT No.: PCT/JP2022/020553

§ 371 (c)(1),
(2) Date: Nov. 17, 2023

(87) PCT Pub. No.: WO2022/244779

PCT Pub. Date: Nov. 24, 2022

(65) Prior Publication Data

US 2024/0239085 A1 Jul. 18, 2024

(30) Foreign Application Priority Data

May 18, 2021 (JP) ................................. 2021-084067

(51) Int. Cl.

| | |
|---|---|
| ***C01G 15/00*** | (2006.01) |
| ***B32B 17/10*** | (2006.01) |

(Continued)

(52) U.S. Cl.

CPC .. *B32B 17/10614* (2013.01); *B32B 17/10036* (2013.01); *B32B 17/10605* (2013.01);

(Continued)

(58) Field of Classification Search

None

See application file for complete search history.

(56) References Cited

U.S. PATENT DOCUMENTS

| | | | |
|---|---|---|---|
| 6,673,456 | B1 | 1/2004 | Kobata et al. |
| 2005/0181220 | A1 | 8/2005 | Kobata et al. |

(Continued)

FOREIGN PATENT DOCUMENTS

| | | |
|---|---|---|
| EP | 2 495 217 | 12/2018 |
| JP | 2010-100519 | 5/2010 |

(Continued)

OTHER PUBLICATIONS

International Search Report issued Jul. 19, 2022 in International (PCT) Application No. PCT/JP2022/020553.

(Continued)

*Primary Examiner* — Kim S. Horger

(74) *Attorney, Agent, or Firm* — Wenderoth, Lind & Ponack, L.L.P.

(57) ABSTRACT

Provided is a dispersion capable of enhancing the transparency and the heat shielding property of an obtained interlayer film for laminated glass when a material containing the dispersion is used as a material for the interlayer film for laminated glass. The dispersion according to the present invention includes tin-doped indium oxide particles having at least one configuration selected from the group consisting of a first configuration (when a sum total of integrated intensities of peaks in wide-angle X-ray scattering is represented by $I_t$, and integrated intensity of a peak of (222) plane is represented by $I_0$, $I_0/I_t$ is less than 0.380), a second (Continued)

configuration (when integrated intensity of a peak of (222) plane in wide-angle X-ray scattering is represented by $I_0$, and integrated intensity of a peak of (622) plane is represented by $I_a$, $I_a/I_0$ is 0.31 or more) and a third configuration (when integrated intensity of a peak of (222) plane in wide-angle X-ray scattering is represented by $I_0$, and integrated intensity of a peak of (440) plane is represented by $I_b$, $I_b/I_0$ is 0.41 or more), and a dispersion medium.

29 Claims, 2 Drawing Sheets

(51) Int. Cl.

| | |
|---|---|
| ***C09J 7/38*** | (2018.01) |
| ***C09J 11/04*** | (2006.01) |
| ***C09J 11/06*** | (2006.01) |
| ***C09J 11/08*** | (2006.01) |

(52) U.S. Cl.

CPC .............. *C01G 15/00* (2013.01); *C09J 7/381* (2018.01); *C09J 11/04* (2013.01); *C09J 11/06* (2013.01); *C09J 11/08* (2013.01); *C01P 2002/54* (2013.01); *C01P 2002/72* (2013.01); *C01P 2002/74* (2013.01); *C01P 2004/64* (2013.01); *C09J 2301/408* (2020.08); *C09J 2400/146* (2013.01); *C09J 2431/00* (2013.01)

(56) References Cited

U.S. PATENT DOCUMENTS

| | | | | |
|---|---|---|---|---|
| 2006/0225614 | A1 | 10/2006 | Hagiwara et al. | |
| 2012/0164457 | A1 | 6/2012 | Fukatani et al. | |
| 2012/0211692 | A1 | 8/2012 | Shimaishi et al. | |
| 2012/0258297 | A1 | 10/2012 | Hagiwara et al. | |
| 2013/0122305 | A1* | 5/2013 | Shiraishi | C03C 17/34 428/402 |
| 2013/0187104 | A1 | 7/2013 | Shiraishi et al. | |
| 2016/0154153 | A1* | 6/2016 | Tsunoda | C08K 5/56 359/360 |
| 2017/0358383 | A1* | 12/2017 | Fujino | G06F 3/041 |
| 2019/0256686 | A1 | 8/2019 | Takayama et al. | |

FOREIGN PATENT DOCUMENTS

| | | |
|---|---|---|
| JP | 2012-62230 | 3/2012 |
| WO | 01/25162 | 4/2001 |
| WO | 01/42158 | 6/2001 |
| WO | 2005/061405 | 7/2005 |
| WO | 2012/057053 | 5/2012 |

OTHER PUBLICATIONS

International Preliminary Report on Patentability and Written Opinion issued Nov. 21, 2023 in corresponding International (PCT) Patent Application No. PCT/JP2022/020553.

Shaojuan Luo et al., "Synthesis and application of non-agglomerated ITO nanocrystals via pyrolysis of indium-tin stearate without using additional organic solvents", J Nanopart Res, vol. 16, 2014, 12 pages.

Haitao Liu et al., "A simple two-step method to fabricate highly transparent ITO/polymer nanocomposite films", Applied Surface Science, vol. 258, 8564-8569, 2012.

* cited by examiner

[FIG. 1.]
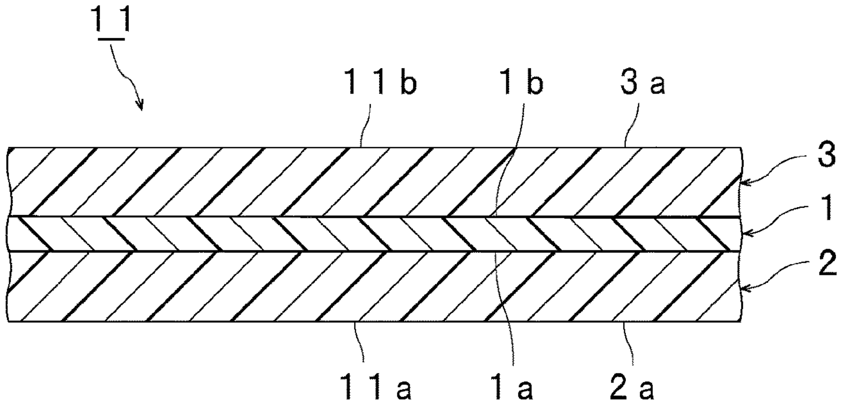
[FIG. 2.]
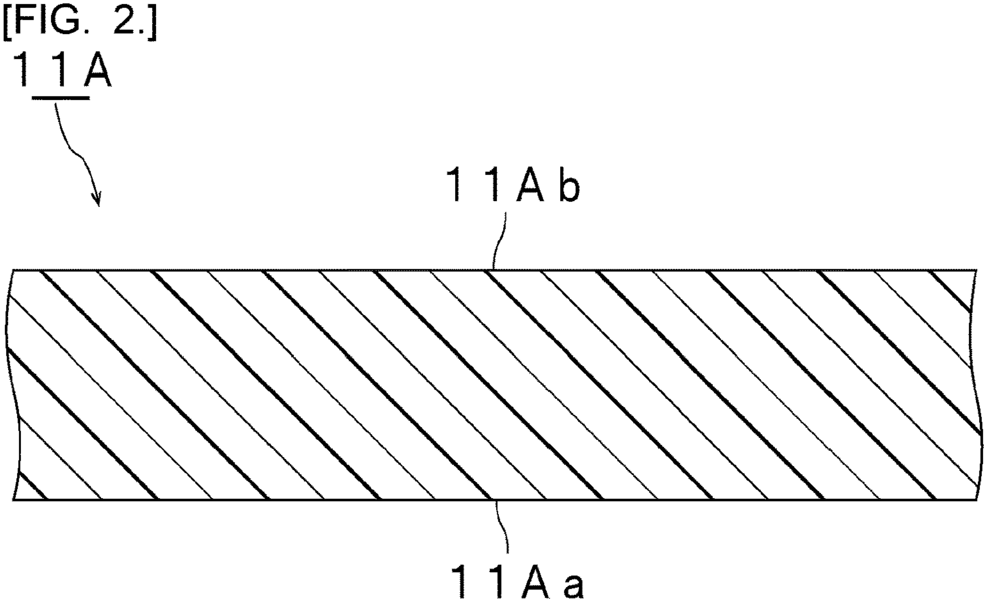
[FIG. 3.]
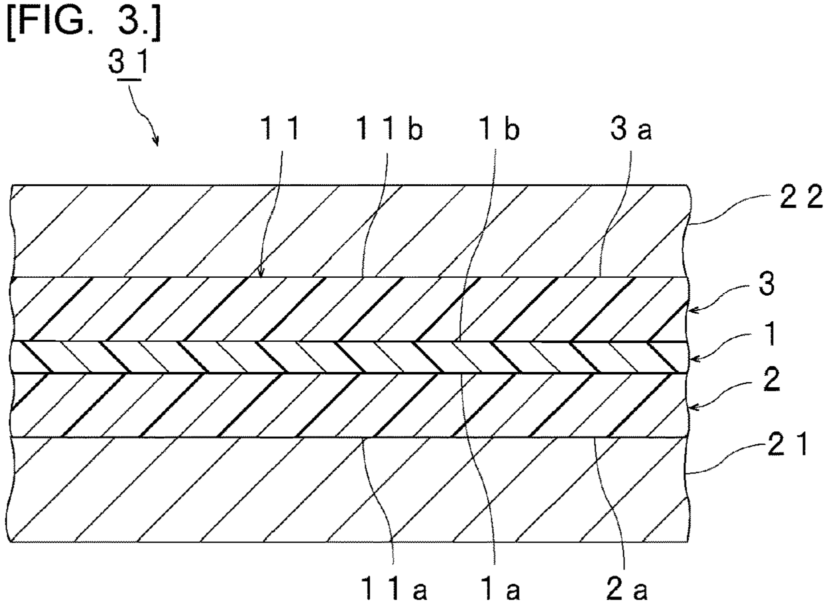

[FIG. 4.]
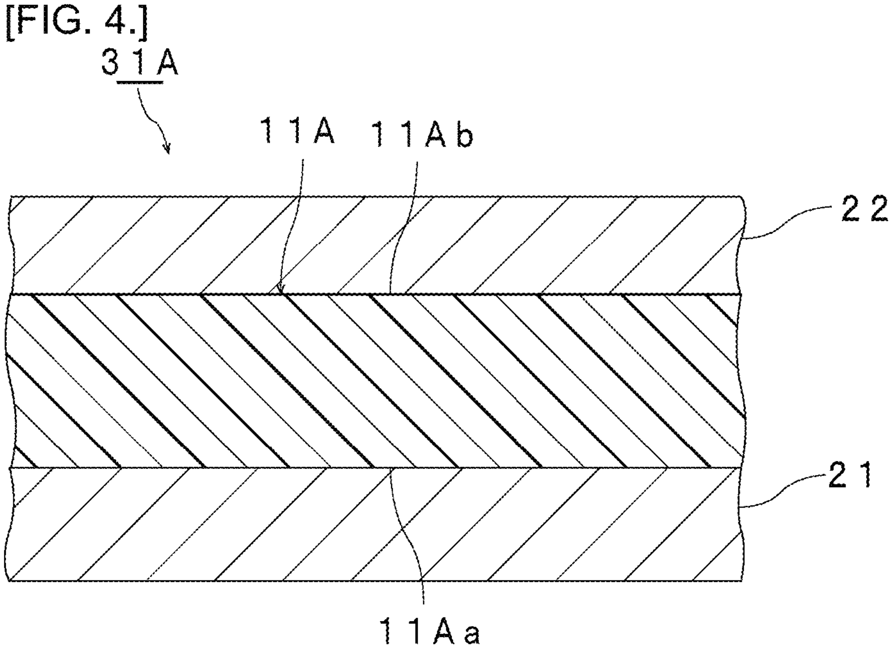
[FIG. 5.]
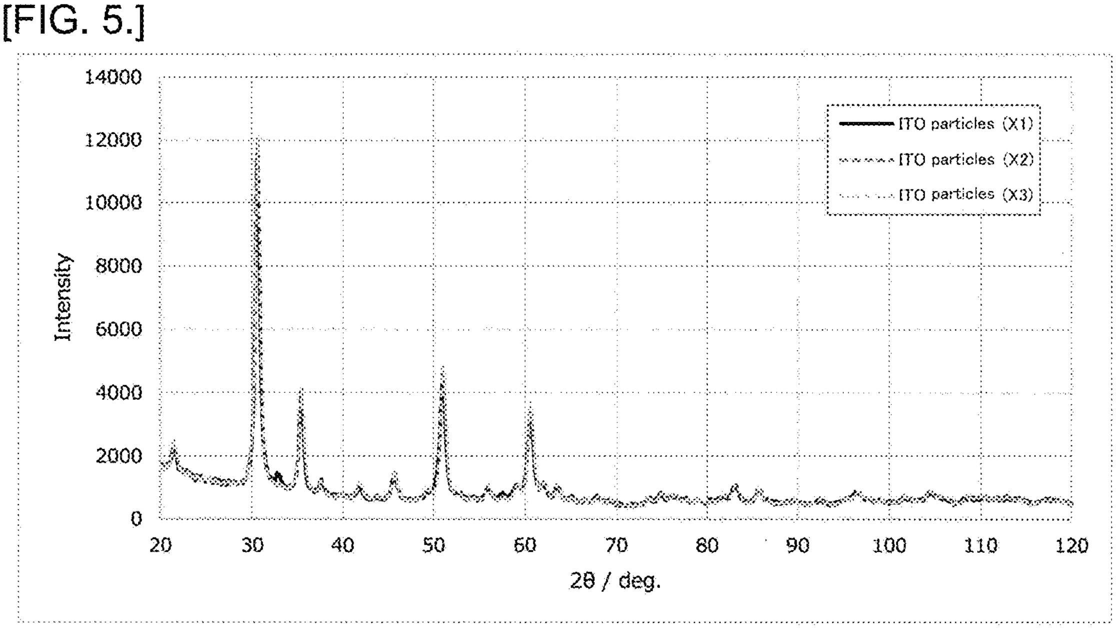

DISPERSION, RESIN COMPOSITION, INTERMEDIATE FILM FOR LAMINATED GLASS, AND LAMINATED GLASS

TECHNICAL FIELD

The present invention relates to a dispersion in which tin-doped indium oxide particles are dispersed, and a resin composition containing the dispersion. Moreover, the present invention relates to an interlayer film for laminated glass containing tin-doped indium oxide particles, and a laminated glass prepared with the interlayer film for laminated glass.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. Therefore, it is necessary to sufficiently shield the infrared rays so as to enhance the heat shielding properties of a laminated glass.

In order to effectively block the infrared rays (heat rays), the following Patent Document 1 discloses an interlayer film containing tin-doped indium oxide particles (ITO particles) or antimony-doped tin oxide particles (ATO particles).

RELATED ART DOCUMENT

Patent Document

Patent Document 1: WO2001/025162 A1

SUMMARY OF THE INVENTION

Problems to be Solved by the Invention

In a conventional interlayer film containing tin-doped indium oxide particles (ITO particles), it is difficult to enhance both the transparency and the heat shielding property.

It is an object of the present invention to provide a dispersion capable of enhancing the transparency and the heat shielding property of an obtained interlayer film for laminated glass when a material containing the dispersion is used as a material for the interlayer film for laminated glass. It is also an object of the present invention is to provide an interlayer film for laminated glass capable of enhancing the transparency and the heat shielding property. It is also an object of the present invention to provide a resin composition prepared with the dispersion, and a laminated glass prepared with the interlayer film for laminated glass.

Means for Solving the Problems

According to a broad aspect of the present invention, there is provided a dispersion containing tin-doped indium oxide particles having at least one configuration selected from the group consisting of a first configuration below, a second configuration below and a third configuration below, and a dispersion medium.

First configuration: When a sum total of integrated intensities of peaks observed in wide-angle X-ray scattering of the tin-doped indium oxide particles is represented by $I_t$, and integrated intensity of a peak of (222) plane is represented by $I_0$, $I_0/I_t$ is less than 0.380.

Second configuration: When integrated intensity of a peak of (222) plane observed in wide-angle X-ray scattering of the tin-doped indium oxide particles is represented by $I_0$, and integrated intensity of a peak of (622) plane is represented by $I_a$, $I_a/I_0$ is 0.31 or more.

Third configuration: When integrated intensity of a peak of (222) plane observed in wide-angle X-ray scattering of the tin-doped indium oxide particles is represented by $I_0$, and integrated intensity of a peak of (440) plane is represented by $I_b$, $I_b/I_0$ is 0.41 or more.

In a specific aspect of the dispersion according to the present invention, the tin-doped indium oxide particles have the first configuration.

In a specific aspect of the dispersion according to the present invention, the tin-doped indium oxide particles have the second configuration.

In a specific aspect of the dispersion according to the present invention, the tin-doped indium oxide particles have the third configuration.

In a specific aspect of the dispersion according to the present invention, the tin-doped indium oxide particles have at least two configurations selected from the group consisting of the first configuration, the second configuration, and the third configuration.

In a specific aspect of the dispersion according to the present invention, the tin-doped indium oxide particles have the first configuration, the second configuration, and the third configuration.

In a specific aspect of the dispersion according to the present invention, the dispersion contains a plasticizer.

In a specific aspect of the dispersion according to the present invention, the plasticizer is an organic ester plasticizer.

In a specific aspect of the dispersion according to the present invention, the dispersion medium includes an organic solvent, and the organic solvent includes alcohol. In a specific aspect of the dispersion according to the present invention, the alcohol is monohydric alcohol or dihydric alcohol.

In a specific aspect of the dispersion according to the present invention, the dispersion contains a dispersion stabilizer.

In a specific aspect of the dispersion according to the present invention, the dispersion stabilizer is a sulfate ester compound, a phosphate ester compound, ricinoleic acid, polyricinoleic acid, polycarboxylic acid, or a polyhydric alcohol surfactant.

In a specific aspect of the dispersion according to the present invention, the tin-doped indium oxide particles have an average particle diameter of 10 nm or more and 100 nm or less.

In a specific aspect of the dispersion according to the present invention, the tin-doped indium oxide particles have a crystal lattice constant of 10.11 Å or more and 10.16 Å or less.

According to a broad aspect of the present invention, there is provided a resin composition containing the aforementioned dispersion, and a thermoplastic resin.

According to a broad aspect of the present invention, there is provided an interlayer film for laminated glass (hereinafter, also abbreviated as interlayer film) including a layer formed from the aforementioned resin composition.

According to a broad aspect of the present invention, there is provided an interlayer film for laminated glass (hereinafter, also abbreviated as interlayer film), including a layer X containing tin-doped indium oxide particles having at least one configuration selected from the group consisting of a first configuration below, a second configuration below and third configuration below, and a thermoplastic resin.

First configuration: When a sum total of integrated intensities of peaks observed in wide-angle X-ray scattering of the tin-doped indium oxide particles is represented by $I_t$, and integrated intensity of a peak of (222) plane is represented by $I_0$, $I_0/I_t$ is less than 0.380.

Second configuration: When integrated intensity of a peak of (222) plane observed in wide-angle X-ray scattering of the tin-doped indium oxide particles is represented by $I_0$, and integrated intensity of a peak of (622) plane is represented by $I_a$, $I_a/I_0$ is 0.31 or more.

Third configuration: When integrated intensity of a peak of (222) plane observed in wide-angle X-ray scattering of the tin-doped indium oxide particles is represented by $I_0$, and integrated intensity of a peak of (440) plane is represented by $I_b$, $I_b/I_0$ is 0.41 or more.

In a specific aspect of the interlayer film according to the present invention, the tin-doped indium oxide particles have the first configuration.

In a specific aspect of the interlayer film according to the present invention, the tin-doped indium oxide particles have the second configuration.

In a specific aspect of the interlayer film according to the present invention, the tin-doped indium oxide particles have the third configuration.

In a specific aspect of the interlayer film according to the present invention, the tin-doped indium oxide particles have at least two configurations selected from the group consisting of the first configuration, the second configuration, and the third configuration.

In a specific aspect of the interlayer film according to the present invention, the tin-doped indium oxide particles have the first configuration, the second configuration, and the third configuration.

In a specific aspect of the interlayer film according to the present invention, a content of tin-doped indium oxide particles in the layer X is 0.1 parts by weight or more and 3 parts by weight or less per 100 parts by weight of the thermoplastic resin in the layer X.

In a specific aspect of the interlayer film according to the present invention, the layer X contains a plasticizer.

In a specific aspect of the interlayer film according to the present invention, the plasticizer is an organic ester plasticizer.

In a specific aspect of the interlayer film according to the present invention, a content of the plasticizer in the layer X is 20 parts by weight or more and 60 parts by weight or less per 100 parts by weight of the thermoplastic resin in the layer X.

In a specific aspect of the interlayer film according to the present invention, the tin-doped indium oxide particles have an average particle diameter of 10 nm or more and 100 nm or less.

In a specific aspect of the interlayer film according to the present invention, the tin-doped indium oxide particles have a crystal lattice constant of 10.11 Å or more and 10.16 Å or less.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

A dispersion according to the present invention contains tin-doped indium oxide particles having at least one configuration selected from the group consisting of the first configuration, the second configuration and the third configuration, and a dispersion medium. In the dispersion according to the present invention, since the above configuration is provided, it is possible to enhance the transparency and the heat shielding property of an obtained interlayer film for laminated glass when a material containing the dispersion is used as a material for the interlayer film for laminated glass.

An interlayer film according to the present invention includes a layer X containing tin-doped indium oxide particles having at least one configuration selected from the group consisting of the first configuration, the second configuration, and the third configuration, and a thermoplastic resin. In the interlayer film according to the present invention, since the above-described configuration is provided, it is possible to enhance the transparency and the heat shielding property.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is measurement data in wide-angle X-ray scattering of tin-doped indium oxide particles used in Examples.

MODES FOR CARRYING OUT THE INVENTION

Hereinafter, the details of the present invention will be described.

A dispersion according to the present invention contains tin-doped indium oxide particles having at least one configuration selected from the group consisting of the following first configuration, the following second configuration and the following third configuration, and a dispersion medium.

An interlayer film for laminated glass according to the present invention (in the present description, also abbreviated as "interlayer X film") includes a layer containing tin-doped indium oxide particles having at least one configuration selected from the group consisting of the following first configuration, the following second configuration and the following third configuration, and a thermoplastic resin.

First configuration: When a sum total of integrated intensities of peaks observed in wide-angle X-ray scattering of the tin-doped indium oxide particles is represented by $I_t$, and integrated intensity of a peak of (222) plane is represented by $I_0$, $I_0/I_t$ is less than 0.380.

Second configuration: When integrated intensity of a peak of (222) plane observed in wide-angle X-ray scattering of the tin-doped indium oxide particles is represented by $I_0$, and integrated intensity of a peak of (622) plane is represented by $I_a$, $I_a/I_0$ is 0.31 or more.

Third configuration: When integrated intensity of a peak of (222) plane observed in wide-angle X-ray scattering of the tin-doped indium oxide particles is represented by $I_0$, and integrated intensity of a peak of (440) plane is represented by $I_b$, $I_b/I_0$ is 0.41 or more.

In the dispersion according to the present invention, since the above configuration is provided, it is possible to enhance the transparency and the heat shielding property of an obtained interlayer film for laminated glass when a material containing the dispersion is used as a material for the interlayer film for laminated glass. A material containing the dispersion used as a material for the interlayer film is, for example, a resin composition containing the dispersion and a thermoplastic resin. In the dispersion according to the present invention, when the resin composition is used as a material for an interlayer film, it is possible to enhance the transparency and the heat shielding property of the obtained interlayer film.

In the interlayer film according to the present invention, since the above-described configuration is provided, it is possible to enhance the transparency and the heat shielding property.

In a conventional interlayer film containing tin-doped indium oxide particles (ITO particles), it is difficult to enhance both the transparency and the heat shielding property of the interlayer film. The present inventors found that the transparency of the interlayer film changes and the heat shielding property changes owing to the difference in crystallinity of ITO particles. In the present invention, since ITO particles having a specific configuration is used, it is possible to enhance both the transparency and the heat shielding property of the interlayer film.

(Tin-Doped Indium Oxide Particles)

A dispersion according to the present invention contains tin-doped indium oxide particles having at least one configuration selected from the group consisting of the first configuration, the second configuration and the third configuration. An interlayer film according to the present invention includes a layer X containing tin-doped indium oxide particles having at least one configuration selected from the group consisting of the first configuration, the second configuration and the third configuration.

Hereinafter, in the present description, tin-doped indium oxide particles having at least one configuration selected from the group consisting of the first configuration, the second configuration, and the third configuration are sometimes referred to as "ITO particles (X)".

Therefore, the dispersion contains ITO particles (X). The interlayer film contains ITO particles (X). The interlayer film includes a layer containing ITO particles (X). The interlayer film includes a layer (layer X) containing ITO particles (X) and a thermoplastic resin. When the interlayer film is a multi-layered interlayer film, the interlayer film includes at least one layer containing ITO particles (X).

A sum total $I_t$ of integrated intensities of peaks in wide-angle X-ray scattering of ITO particles, integrated intensity $I_0$ of a peak of (222) plane, integrated intensity $I_a$ of a peak of (622) plane, and integrated intensity $I_b$ of a peak of (440) plane are measured under the following conditions.

Tube lamp: Cu tube lamp

Tube voltage: 40 kV

Tube current: 40 mA

Measurement method: Focusing method

X-ray diffraction method: θ-2θ method

ITO particles (X) can be obtained, for example, in the following manner.

An aqueous solution containing indium chloride and a small amount of water-soluble salt of tin chloride is reacted with alkali, to coprecipitate a hydroxide of indium and a hydroxide of tin. The coprecipitate, as a raw material, is heated and fired in nitrogen from which oxygen is removed, and thus converted into an oxide. Thus, ITO particles (X) can be produced.

$I_t$ is also preferred that ITO particles (X) have the first configuration, it is also preferred that ITO particles (X) have the second configuration, and it is also preferred that ITO particles (X) have the third configuration. ITO particles (X) may have only the first configuration, ITO particles (X) may have only the second configuration, and ITO particles (X) may have only the third configuration.

From the viewpoint of exerting the effect of the present invention more effectively, it is preferred that ITO particles (X) have at least two configurations selected from the group consisting of the first configuration, the second configuration, and the third configuration. From the viewpoint of exerting the effect of the present invention still effectively, it is preferred that ITO particles (X) have the first configuration, the second configuration, and the third configuration.

The ITO particles (X) having the first configuration are ITO particles that satisfy $I_0/I_t$ (ratio of $I_0$ to $I_t$) of less than 0.380 when a sum total of integrated intensities of peaks in wide-angle X-ray scattering of the ITO particles is represented by $I_t$, and integrated intensity of a peak of (222) plane is represented by $I_0$.

In the ITO particles (X) having the first configuration, an integrated intensity ratio ($I_0/I_t$) is preferably 0.300 or more, more preferably 0.330 or more, further preferably 0.360 or more, and is preferably 0.379 or less. When the integrated intensity ratio ($I_0/I_t$) is the aforementioned lower limit or more and the aforementioned upper limit or less, it is possible to exert the effect of the present invention more effectively. In the ITO particles (X) having the second configuration or the third configuration, the integrated intensity ratio ($I_0/I_t$) may be 0.420 or less, and may be 0.400 or less.

The ITO particles (X) having the second configuration are ITO particles that satisfy $I_a/I_0$ (ratio of $I_a$ to $I_0$) of 0.31 or more when integrated intensity of a peak of (222) plane in wide-angle X-ray scattering of the ITO particles is represented by $I_0$, and integrated intensity of a peak of (622) plane is represented by $I_a$.

In the ITO particles (X) having the second configuration, the integrated intensity ratio ($I_a/I_0$) is preferably 0.310 or more, more preferably 0.320 or more, further preferably 0.330 or more, and is preferably 0.360 or less, more preferably 0.350 or less, further preferably 0.340 or less. When the integrated intensity ratio ($I_a/I_0$) is the aforementioned lower limit or more and the aforementioned upper limit or less, it is possible to exert the effect of the present invention more effectively.

The ITO particles (X) having the third configuration are ITO particles that satisfy $I_b/I_0$ (ratio of Ip to $I_0$) of 0.41 or more when integrated intensity of a peak of (222) plane in wide-angle X-ray scattering of the ITO particles is represented by $I_0$, and integrated intensity of a peak of (440) plane is represented by $I_b$.

In the ITO particles (X) having the third configuration, the integrated intensity ratio ($I_b/I_0$) is preferably 0.410 or more, and is preferably 0.440 or less, more preferably 0.430 or less, further preferably 0.420 or less. When the integrated intensity ratio ($I_b/I_0$) is the aforementioned lower limit or more and the aforementioned upper limit or less, it is possible to exert the effect of the present invention more effectively. In the ITO particles (X) having the first configuration or the second configuration, the integrated intensity ratio ($I_b/I_0$) may be 0.390 or more, and may be 0.400 or more.

The average particle diameter of ITO particles (X) contained in the dispersion is preferably 5 nm or more, more preferably 10 nm or more, and is preferably 100 nm or less, more preferably 90 nm or less. When the average particle diameter is the aforementioned lower limit or more, the heat ray shielding properties of the obtained interlayer film are sufficiently enhanced. When the average particle diameter is the aforementioned upper limit or less, the dispersibility of ITO particles (X) is enhanced. When the average particle diameter is the aforementioned lower limit or more and the aforementioned upper limit or less, it is possible to further enhance both the transparency and the heat shielding property of the obtained interlayer film.

The average particle diameter of ITO particles (X) contained in the layer X is preferably 5 nm or more, more preferably 10 nm or more, and is preferably 100 nm or less, more preferably 90 nm or less. When the average particle diameter is the aforementioned lower limit or more, the heat ray shielding properties are sufficiently enhanced. When the average particle diameter is the aforementioned upper limit or less, the dispersibility of ITO particles (X) is enhanced. When the average particle diameter is the aforementioned lower limit or more and the aforementioned upper limit or less, it is possible to further enhance both the transparency and the heat shielding property.

The "average particle diameter" refers to the volume average particle diameter. The average particle diameter of ITO particles (X) can be measured using a particle size distribution measuring device (for example, "LB-550" and "SZ-100" available from HORIBA, Ltd.) or the like.

It is also preferred that ITO particles (X) include first tin-doped indium oxide particles having an average particle diameter of 5 nm or more and less than 60 nm (first ITO particles (X)), and second tin-doped indium oxide particles having an average particle diameter of 60 nm or more and 100 nm or less (second ITO particles (X)). In this case, blue scattering by Rayleigh scattering due to small average particle diameter of ITO particles (X) is effectively suppressed, and the haze is ameliorated. When the average particle diameter of ITO particles (X) is small, the durability of the interlayer film can be impaired, however, use of the ITO particles (X) having a large average particle diameter can enhance the durability of the interlayer film.

In particle size distribution of ITO particles (X) on the basis of volume, it is preferred that two or more peaks exist in a region of particle diameters of 5 nm or more and 100 nm or less. In particle size distribution of ITO particles (X) on the basis of volume, it is preferred that two or more peaks exist in a region of particle diameters of 5 nm or more and 100 nm or less, and it is more preferred that at least one peak of the two or more peaks exist in a region of particle diameters of 5 nm or more and less than 60 nm. In particle size distribution of ITO particles (X) on the basis of volume, it is preferred that two or more peaks exist in a region of particle diameters of 5 nm or more and 100 nm or less, and it is more preferred that at least one peak of the two or more peaks exist in a region of particle diameters of 60 nm or more and 100 nm or less. In these cases, blue scattering by Rayleigh scattering due to small average particle diameter of ITO particles (X) is effectively suppressed, and the haze is ameliorated. When the average particle diameter of ITO (X) particles is small, the durability of the interlayer film can be impaired, however, use of the ITO particles (X) having a large average particle diameter can enhance the durability of the interlayer film.

In the layer X, a content of ITO particles (X) having a particle diameter of 50 nm or more is preferably 5 particles/$\mu m^2$ or less, more preferably 0.1 particles/$\mu m^2$ or less. In this case, blue scattering by Rayleigh scattering due to small average particle diameter of ITO particles (X) is effectively suppressed, and the haze is ameliorated. When the average particle diameter of ITO particles (X) is small, the durability of the interlayer film can be impaired, however, use of the ITO particles (X) having a large average particle diameter can enhance the durability of the interlayer film. In the layer X, a content of ITO particles (X) having a particle diameter of 50 nm or more may be 0 particle/$\mu m^2$, and may be more than 0 particle/$\mu m^2$.

A content (particles/$\mu m^2$) of ITO particles (X) having a particle diameter of 50 nm can be measured by observing the layer X under an electron microscope (TEM).

A crystal lattice constant of ITO particles (X) contained in the dispersion is preferably 10.11 Å or more, and is preferably 10.16 Å or less. When the crystal lattice constant is the aforementioned lower limit or more and the aforementioned upper limit or less, it is possible to further enhance both the transparency and the heat shielding property of the obtained interlayer film.

A crystal lattice constant of ITO particles (X) contained in the layer X is preferably 10.11 Å or more, and is preferably 10.16 Å or less. When the crystal lattice constant is the aforementioned lower limit or more and the aforementioned upper limit or less, it is possible to further enhance both the transparency and the heat shielding property.

A crystal lattice constant of ITO particles (X) can be determined by measurement of X-ray diffraction.

In 100% by weight of the dispersion, the content of ITO particles (X) is preferably 108 by weight or more, more preferably 20% by weight or more, further preferably 30% by weight or more, and is preferably 75% by weight or less, more preferably 60% by weight or less, further preferably 45% by weight or less. When the content of ITO particles (X) is the aforementioned lower limit or more and the aforementioned upper limit or less, it is possible to further enhance both the transparency and the heat shielding property of the obtained interlayer film.

In 100% by weight of the layer X, the content of ITO particles (X) is preferably 0.01% by weight or more, more preferably 0.1% by weight or more, still more preferably 0.5% by weight or more, further preferably 1% by weight or more, especially preferably 1.5% by weight or more. In 100% by weight of the layer X, the content of ITO particles (X) is preferably 6% by weight or less, more preferably 5.5% by weight or less, further preferably 4% by weight or less, especially preferably 3.5% by weight or less, most preferably 3% by weight or less. When the content of ITO particles (X) is the aforementioned lower limit or more and the aforementioned upper limit or less, it is possible to further enhance both the transparency and the heat shielding property.

The content of ITO particles (X) in the layer X relative to 100 parts by weight of the thermoplastic resin in the layer X is preferably 0.01 parts by weight or more, more preferably 0.1 parts by weight or more, and is preferably 10 parts by weight or less, more preferably 6 parts by weight or less, further preferably 3 parts by weight or less. When the content of ITO particles (X) is the aforementioned lower limit or more and the aforementioned upper limit or less, it is possible to further enhance both the transparency and the heat shielding property.

(Plasticizer)

It is preferred that the dispersion contain a plasticizer. In the dispersion, the plasticizer may serve as a dispersion medium. It is preferred that the interlayer film contain a plasticizer. It is preferred that the layer X contain a plasticizer. The later-described first layer may contain or need not contain a plasticizer. The later-described second layer may contain or need not contain a plasticizer. The later-described third layer may contain or need not contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic ester, acid organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include dihexyl adipate, tetraethylene glycol-di-2-ethylhexanoate, tetraethylene glycol-di-heptanoate, triethylene glycol-di-heptanoate, triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the organic ester plasticizer, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

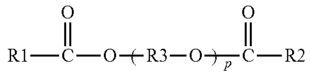

(1)

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms. In the formula (1), R1 and R2 may be the same as or different from each other.

It is preferred that the plasticizer be an organic ester plasticizer. It is preferred that the plasticizer include dihexyl adipate, tetraethylene glycol-di-2-ethylhexanoate, tetraethylene glycol-di-heptanoate, triethylene glycol-di-heptanoate, triethylene glycol di-2-ethylbutylate, triethylene glycol di-2-ethylhexanoate, or tetraethylene glycol di-2-ethylbutylate.

It is more preferred that the plasticizer include triethylene glycol di-2-ethylhexanoate (3GO), triethylene glycol di-2-ethylbutyrate (3GH) or triethylene glycol di-2-ethylpropanoate. It is further preferred that the plasticizer include triethylene glycol di-2-ethylhexanoate (3GO) or triethylene glycol di-2-ethylbutyrate (3GH), and it is especially preferred that the plasticizer include triethylene glycol di-2-ethylhexanoate (3GO).

In 100% by weight of the dispersion, the content of the plasticizer is preferably 15% by weight or more, more preferably 25% by weight or more, further preferably 35% by weight or more, and is preferably 90% by weight or less, more preferably 80% by weight or less, further preferably 70% by weight or less. When the content of the plasticizer is the aforementioned lower limit or more, the flexibility of the obtained interlayer film is enhanced and the handling of the interlayer film is facilitated. When the content of the plasticizer is the aforementioned upper limit or less, the penetration resistance of laminated glass is further enhanced.

In a resin composition containing the dispersion and a thermoplastic resin, the content of the plasticizer per 100 parts by weight of the thermoplastic resin is preferably 15 parts by weight or more, more preferably 25 parts by weight or more, further preferably 35 parts by weight or more, and is preferably 80 parts by weight or less, more preferably 65 parts by weight or less, further preferably 50 parts by weight or less. When the content of the plasticizer is the aforementioned lower limit or more, the flexibility of the obtained interlayer film is enhanced and the handling of the interlayer film is facilitated. When the content of the plasticizer is the aforementioned upper limit or less, the penetration resistance of laminated glass is further enhanced.

The content of the plasticizer in the layer containing the plasticizer per 100 parts by weight of the thermoplastic resin in the layer containing the plasticizer is preferably 20 parts by weight or more, more preferably 30 parts by weight or more, and is preferably 60 parts by weight or less, more preferably 50 parts by weight or less. When the content of the plasticizer is the aforementioned lower limit or more, the flexibility of the interlayer film is enhanced and the handling of the interlayer film is facilitated. When the content of the plasticizer is the aforementioned upper limit or less, the penetration resistance of laminated glass is further enhanced.

The content of the plasticizer in the layer X per 100 parts by weight of the thermoplastic resin in the layer X is preferably 20 parts by weight or more, more preferably 30 parts by weight or more, and is preferably 60 parts by weight or less, more preferably 50 parts by weight or less. When the content of the plasticizer is the aforementioned lower limit or more, the flexibility of the interlayer film is enhanced and the handling of the interlayer film is facilitated. When the content of the plasticizer is the aforementioned upper limit or less, the penetration resistance of laminated glass is further enhanced.

(Organic Solvent)

It is preferred that the dispersion contain an organic solvent. In the dispersion, the organic solvent serves as a dispersion medium. Therefore, it is preferred that the dispersion medium contain the organic solvent. The interlayer film may contain or need not contain an organic solvent. The layer X may contain or need not contain an organic solvent. When the resin composition containing the dispersion is used as a material for an interlayer film, generally, most or all of the organic solvent volatilizes at the time of molding. Therefore, the layer X contains little or no organic solvent. The later-described first layer may contain or need not contain an organic solvent. The later-described second layer may contain or need not contain an organic solvent. The later-described third layer may contain or need not contain an organic solvent.

Examples of the organic solvent include alcohol and carboxylic acid and the like. One kind of the organic solvent may be used alone and two or more kinds thereof may be used in combination.

Examples of the alcohol include monohydric alcohol, dihydric alcohol, and tri- or higher hydric alcohols. One kind of the alcohol may be used alone, and two or more kinds thereof may be used in combination.

Examples of the alcohol include methanol, ethanol, propanol, isopropanol, n-butanol, isobutanol, sec-butanol, tert-butanol, lauryl alcohol, diacetone alcohol, cyclohexanol, ethylene glycol, diethylene glycol, and triethylene glycol, and the like.

From the viewpoint of enhancing the dispersibility of ITO particles (X), it is preferred that the alcohol be monohydric alcohol or dihydric alcohol. It is preferred that the alcohol include methanol, ethanol, propanol, isopropanol, n-butanol, isobutanol, sec-butanol, tert-butanol, lauryl alcohol, diacetone alcohol, cyclohexanol, ethylene glycol, diethylene glycol, or triethylene glycol. In this case, it is possible to further enhance the dispersibility of ITO particles (X).

In 100% by weight of the organic solvent, the content of the alcohol is preferably more than 0% by weight, more preferably 1% by weight or more, further preferably 2% by weight or more, and is preferably 20% by weight or less, more preferably 18% by weight or less, further preferably 16% by weight or less. When the content of the alcohol satisfies the aforementioned lower and limit the aforementioned upper limit, it is possible to further enhance the dispersibility of ITO particles (X). In 100% by weight of the organic solvent, the content of the alcohol may be 100% by weight. That is, the organic solvent may be alcohol.

In 100% by weight of the dispersion, the content of the organic solvent is preferably more than 0% by weight, more preferably 18 by weight or more, further preferably 2% by weight or more, and is preferably 20% by weight or less, more preferably 19% by weight or less, further preferably 18% by weight or less. When the content of the organic solvent satisfies the aforementioned lower limit and the aforementioned upper limit, it is possible to further enhance the dispersibility of ITO particles (X).

(Dispersion Stabilizer)

It is preferred that the dispersion contain dispersion stabilizer. It is preferred that the interlayer film contain a dispersion stabilizer. It is preferred that the layer X contain a dispersion stabilizer. By using the dispersion stabilizer, it is possible to enhance the dispersion stability of ITO particles (X), and as a result, the effect of the present invention can be exerted more effectively. The later-described first layer may contain or need not contain a dispersion stabilizer. The later-described second layer may contain or need not contain a dispersion stabilizer. The later-described third layer may contain or need not contain a dispersion stabilizer.

Examples of the dispersion stabilizer include a sulfate ester compound, a phosphate ester compound, ricinoleic acid, polyricinoleic acid, polycarboxylic acid, and a polyhydric alcohol surfactant. One kind of the dispersion stabilizer may be used alone and two or more kinds thereof may be used in combination.

It is preferred that the dispersion stabilizer include a sulfate ester compound, a phosphate ester compound, ricinoleic acid, polyricinoleic acid, polycarboxylic acid, or a polyhydric alcohol surfactant. It is more preferred that the dispersion stabilizer be a sulfate ester compound, a phosphate ester compound, ricinoleic acid, polyricinoleic acid, polycarboxylic acid, or a polyhydric alcohol surfactant. In this case, it is possible to further enhance the dispersion stability of ITO particles (X).

In 100% by weight of the dispersion, the content of the dispersion stabilizer is preferably 1.0% by weight or more, more preferably 2.0% by weight or more, further preferably 3.0% by weight or more, and is preferably 8.0% by weight or less, more preferably 7.0% by weight or less, further preferably 6.0% by weight or less. When the content of the dispersion stabilizer is the aforementioned lower limit or more and the aforementioned upper limit or less, it is possible to further enhance the dispersion stability of ITO particles (X).

In the dispersion, a weight ratio of the content of the ITO particles (X) to the content of the dispersion stabilizer (content of ITO particles (X)/content of dispersion stabilizer) is preferably 0.5 or more, more preferably 1 or more, further preferably 2 or more, and is preferably 20 or less, more preferably 19 or less, further preferably 18 or less. When the weight ratio (content of ITO particles (X)/content of dispersion stabilizer) is the aforementioned lower limit or more and the aforementioned upper limit or less, it is possible to further enhance the dispersion stability of ITO particles (X).

In the resin composition containing the dispersion and a thermoplastic resin, the content of the dispersion stabilizer per 100 parts by weight of the thermoplastic resin is preferably 0.001 parts by weight or more, more preferably 0.005 parts by weight or more, further preferably 0.010 parts by weight or more. In the resin composition containing the dispersion and a thermoplastic resin, the content of the dispersion stabilizer per 100 parts by weight of the thermoplastic resin is preferably 0.030 parts by weight or less, more preferably 0.020 parts by weight or less, further preferably 0.015 parts by weight or less. When the content of the dispersion stabilizer is the aforementioned lower limit or more and the aforementioned upper limit or less, it is possible to further enhance the dispersion stability of ITO particles (X).

In the resin composition containing the dispersion and a thermoplastic resin, a weight ratio of the content of the ITO particles (X) to the content of the dispersion stabilizer (content of ITO particles (X)/content of dispersion stabilizer) is preferably 0.5 or more, more preferably 1 or more, further preferably 2 or more, and is preferably 20 or less, more preferably 19 or less, further preferably 18 or less. When the weight ratio (content of ITO particles (X)/content of dispersion stabilizer) is the aforementioned lower limit or more and the aforementioned upper limit or less, it is possible to further enhance the dispersion stability of ITO particles (X).

In 100% by weight of the layer containing the dispersion stabilizer, the content of the dispersion stabilizer is preferably 0.001% by weight or more, more preferably 0.005% by weight or more, further preferably 0.010% by weight or more, and is preferably 0.020% by weight or less, more preferably 0.016% by weight or less, further preferably 0.012% by weight or less. When the content of the dispersion stabilizer is the aforementioned lower limit or more and the aforementioned upper limit or less, it is possible to further enhance the dispersion stability of ITO particles (X).

In 100% by weight of the layer X, the content of the dispersion stabilizer is preferably 0.001% by weight or more, more preferably 0.005% by weight or more, further preferably 0.010% by weight or more, and is preferably 0.020% by weight or less, more preferably 0.016% by weight or less, further preferably 0.012% by weight or less. When the content of the dispersion stabilizer is the aforementioned lower limit or more and the aforementioned upper limit or less, it is possible to further enhance the dispersion stability of ITO particles (X).

In the layer X, a weight ratio of the content of the ITO particles (X) to the content of the dispersion stabilizer (content of ITO particles (X)/content of dispersion stabilizer) is preferably 0.5 or more, more preferably 1 or more, further preferably 2 or more, and is preferably 20 or less, more preferably 19 or less, further preferably 18 or less. When the weight ratio (content of ITO particles (X)/content of dispersion stabilizer) is the aforementioned lower limit or more and the aforementioned upper limit or less, it is possible to further enhance the dispersion stability of ITO particles (X).

(Thermoplastic Resin)

The resin composition contains a thermoplastic resin. The interlayer film contains a thermoplastic resin. The layer X contains a thermoplastic resin. The later-described first layer may contain or need not contain a thermoplastic resin. The later-described second layer may contain or need not contain a thermoplastic resin. The later-described third layer may contain or need not contain a thermoplastic resin.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used. One kind of the thermoplastic resin may be used alone and two or more kinds thereof may be used in combination.

The thermoplastic resin is preferably a polyvinyl acetal resin, and is more preferably a polyvinyl butyral resin. When the interlayer film is a multi-layered interlayer film having two or more layers, thermoplastic resins respectively contained in these layers may be the same or different from each other.

For example, the polyvinyl acetal resin can be produced by acetalizing polyvinyl alcohol (PVA) with an aldehyde. It is preferred that the polyvinyl acetal resin be an acetalized product of polyvinyl alcohol. The polyvinyl alcohol can be obtained, for example, by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and is preferably 5000 or less, more preferably 4000 or less, further preferably 3500 or less. When the average polymerization degree is the aforementioned lower limit or more, the penetration resistance of laminated glass is further enhanced. When the average polymerization degree is the aforementioned upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more and is preferably 40% by mole or less, more preferably 35% by mole or less. When the content of the hydroxyl group is the aforementioned lower limit or more, the adhesive force of the interlayer film is further enhanced. Moreover, when the content of the hydroxyl group is the aforementioned upper limit or less, the flexibility of the interlayer film is enhanced and the handling of the interlayer film is facilitated.

When the resin composition is used as a material for an intermediate layer of a multi-layered interlayer film, and when the layer X is an intermediate layer of a multi-layered interlayer film, it is preferred that the content of the hydroxyl group (the amount of hydroxyl groups) of the polyvinyl acetal resin satisfy the following lower limit or upper limit. It is preferred that the content of the hydroxyl group (the amount of hydroxyl groups) of the polyvinyl acetal resin contained in the intermediate layer of the multi-layered interlayer film satisfy the following lower limit or upper limit. That is, the content of the hydroxyl group (the amount of hydroxyl groups) of the polyvinyl acetal resin is preferably 17% by mole or more, more preferably 20% by mole or more, further preferably 22% by mole or more. The content of the hydroxyl group (the amount of hydroxyl groups) of the polyvinyl acetal resin is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the aforementioned lower limit or more, the mechanical strength of the interlayer film is further enhanced. In particular, when the content of the hydroxyl group of the polyvinyl acetal resin is 20% by mole or more, the resin is made with high reaction efficiency and is excellent in productivity, when being 28% by mole or less, the sound insulating property of the laminated glass are further enhanced, and when being 28% by mole or less, the sound insulating property is further enhanced. Moreover, when the content of the hydroxyl group is the aforementioned upper limit or less or less than the aforementioned upper limit, the flexibility of the interlayer film is enhanced and the handling of the interlayer film is facilitated. Also, it is preferred that the content of the hydroxyl group of the polyvinyl acetal resin 4 intermediate layer not containing ITO particles (X) satisfy the aforementioned lower limit and the aforementioned upper limit.

When the resin composition is used as a material for a surface layer of a multi-layered interlayer film or a material for a single-layered interlayer film, and when the layer X is a surface layer of a multi-layered interlayer film or a single-layered interlayer film itself, it is preferred that the content of the hydroxyl group (the amount of hydroxyl groups) of the polyvinyl acetal resin satisfy the following lower limit or upper limit. It is preferred that the content of the hydroxyl group (the amount of hydroxyl groups) of the polyvinyl acetal resin contained in the surface layer of the multi-layered interlayer film or the single-layered interlayer film satisfy the following lower limit or upper limit. The content of the polyvinyl acetal resin is preferably 25% by mole or more, more preferably 28% by mole or more, still more preferably 30% by mole or more, further preferably more than 31% mole, still further preferably 31.5% by mole or more, especially preferably 32% by mole or more, most preferably 33% by mole or more. The content of the polyvinyl acetal resin is preferably 38% by mole or less, more preferably 37% by mole or less, further preferably 36.5% by mole or less, especially preferably 36% by mole or less. When the content of the hydroxyl group is the lower limit or more or more than the lower limit, the adhesive force of the interlayer film is further enhanced. Moreover, when the content of the hydroxyl group is the aforementioned upper limit or less, the flexibility of the interlayer film is enhanced and the handling of the interlayer film is facilitated. Also, it is preferred that the content of the hydroxyl group of the polyvinyl acetal resin of the surface layer not containing ITO particles (X) satisfy the aforementioned lower limit and the aforementioned upper limit.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin is preferably 0.1% by mole or more, more preferably 0.3% by mole or more, further preferably 0.5% by mole or more and is preferably 30% by mole or less, more preferably 25% by mole or less, further preferably 20% by mole or less. When the acetylation degree is the aforementioned lower limit or more, the compatibility between the polyvinyl acetal resin and a plasticizer is enhanced. When the acetylation degree is the aforementioned upper limit or less, the moisture resistance of the interlayer film and laminated glass is enhanced.

When the resin composition is used as a material for an intermediate layer of a multi-layered interlayer film, and when the layer X is an intermediate layer of a multi-layered interlayer film, it is preferred that the acetylation degree (the amount of acetyl groups) of the polyvinyl acetal resin satisfy the following lower limit or upper limit. It is preferred that the acetylation degree (the amount of acetyl groups) of the polyvinyl acetal resin contained in the intermediate layer of the multi-layered interlayer film satisfy the following lower limit or upper limit. The acetylation degree (the amount of acetyl groups) of the polyvinyl acetal resin is preferably 0.01% by mole or more, more preferably 0.1% by mole or more, still more preferably 7% by mole or more, further preferably 9% by mole or more and is preferably 30% by mole or less, more preferably 25% by mole or less, further preferably 24% by mole or less, especially preferably 20% by mole or less. When the acetylation degree is the aforementioned lower limit or more, the compatibility between the polyvinyl acetal resin and a plasticizer is enhanced. When the acetylation degree is the aforementioned upper limit or less, the moisture resistance of the interlayer film and laminated glass is enhanced. In particular, when the acetylation degree of the polyvinyl acetal resin is 0.1% by mole or more and is 25% by mole or less, excellent penetration resistance is achieved. Also, it is preferred that the acetylation degree of the polyvinyl acetal resin of the intermediate layer not containing ITO particles (X) satisfy the aforementioned lower limit and the aforementioned upper limit.

When the resin composition is used as a material for a surface layer of a multi-layered interlayer film or a material for a single-layered interlayer film, and when the layer X is a surface layer of a multi-layered interlayer film or a single-layered interlayer film itself, it is preferred that the acetylation degree (the amount of acetyl groups) of the polyvinyl acetal resin satisfy the following lower limit or upper limit. It is preferred that the acetylation degree (the amount of acetyl groups) of the polyvinyl acetal resin contained in the intermediate layer of the multi-layered interlayer film and in the single-layered interlayer film satisfy the following lower limit or upper limit. The acetylation degree (the amount of acetyl groups) of the polyvinyl acetal resin is preferably 0.01% by mole or more, more preferably 0.5% by mole or more and is preferably 10% by mole or less, more preferably 2% by mole or less. When the acetylation degree is the aforementioned lower limit or more, the compatibility between the polyvinyl acetal resin and a plasticizer is enhanced. When the acetylation degree is the aforementioned upper limit or less, the moisture resistance of the interlayer film and laminated glass is enhanced. Also, it is preferred that the acetylation degree of the polyvinyl acetal resin of the surface layer not containing ITO particles (X) satisfy the aforementioned lower limit and the aforementioned upper limit.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

It is preferred that the acetalization degree of the polyvinyl acetal resin (the butyralization degree in the case of a polyvinyl butyral resin) satisfy the following lower limit or upper limit. The acetalization degree of the polyvinyl acetal resin (the butyralization degree in the case of a polyvinyl butyral resin) is preferably 60% by mole or more, more preferably 63% by mole or more, and is preferably 85% by mole or less, more preferably 75% by mole or less, further preferably 70% by mole or less. When the acetalization degree is the aforementioned lower limit or more, the compatibility between the polyvinyl acetal resin and a plasticizer is enhanced. When the acetalization degree is the aforementioned upper limit or less, the reaction time required for producing the polyvinyl acetal resin is shortened.

When the resin composition is used as a material for an intermediate layer of a multi-layered interlayer film, and when the layer X is an intermediate layer of a multi-layered interlayer it is film, preferred that the acetalization degree of the polyvinyl acetal resin (the butyralization degree in the case of a polyvinyl butyral resin) satisfy the following lower limit or upper limit. It is preferred that the acetalization degree of the polyvinyl acetal resin (the butyralization degree in the case of a polyvinyl butyral resin) contained in the intermediate layer of the multi-layered interlayer film satisfy the following lower limit or upper limit. The acetalization degree of the polyvinyl acetal resin (the butyralization degree in the case of a polyvinyl butyral resin) is preferably 47% by mole or more, more preferably 60% by mole or more, and is preferably 85% by mole or less, more preferably 80% by mole or less, further preferably 75% by mole or less. When the acetalization degree is the aforementioned lower limit or more, the compatibility between the polyvinyl acetal resin and a plasticizer is enhanced. When the acetalization degree is the aforementioned upper limit or less, the reaction time required for producing the polyvinyl acetal resin is shortened. Also, it is preferred that the acetalization degree of the polyvinyl acetal resin of the intermediate layer not containing ITO particles (X)) satisfy the aforementioned lower limit and the aforementioned upper limit.

When the resin composition is used as a material for a surface layer of a multi-layered interlayer film or a material for a single-layered interlayer film, and when the layer X is a surface layer of a multi-layered interlayer film or a single-layered interlayer film itself, it is preferred that the acetalization degree of the polyvinyl acetal resin (the butyralization degree in the case of a polyvinyl butyral resin) satisfy the following lower limit or upper limit. It is preferred that the acetalization degree of the polyvinyl acetal resin (the butyralization degree in the case of a polyvinyl butyral resin) contained in the surface layer of the multi-layered interlayer film or the single-layered interlayer film satisfy the following lower limit or upper limit. The acetalization degree of the polyvinyl acetal resin (the butyralization degree in the case of a polyvinyl butyral resin) is preferably 55% by mole or more, more preferably 60% by mole or more and is preferably 75% by mole or less, more preferably 71% by mole or less. When the acetalization degree is the aforementioned lower limit or more, the compatibility between the polyvinyl acetal resin and a plasticizer is enhanced. When the acetalization degree is the aforementioned upper limit or less, the reaction time required for producing the polyvinyl acetal resin is shortened. Also, it is preferred that the acetalization degree of the polyvinyl acetal resin of the surface layer not containing ITO particles (X) satisfy the aforementioned lower limit and the aforementioned upper limit.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6728 "Testing methods for polyvinyl butyral".

In 100% by weight of the thermoplastic resin contained in the resin composition, the content of the polyvinyl acetal resin is preferably 10% by weight or more, more preferably or 30% by weight more, still more preferably 50% by weight or more, further preferably 70% by weight or more, especially preferably 80% by weight or more, most preferably 90% by weight or more, and is preferably 100% by weight or less. It is preferred that the main ingredient (50% by weight or more) of the thermoplastic resin in the resin composition be a polyvinyl acetal resin.

In 100% by weight of the thermoplastic resin contained in a layer containing a thermoplastic resin, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more, and is preferably 100% by weight or less. It is preferred that the main ingredient (50% by weight or more) of the thermoplastic resin in the layer containing the thermoplastic resin be a polyvinyl acetal resin.

In 100% by weight of the thermoplastic resin contained in the layer X, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more, and is preferably 100% by weight or less. It is preferred that the main ingredient (50% by weight or more) of the thermoplastic resin in the layer X be a polyvinyl acetal resin.

(Other Ingredients)

The dispersion may or need not contain other ingredient than the above-described ingredients. The resin composition may or need not contain other ingredient than the above-described ingredients. The layer X may or need not contain other ingredient than the above-described ingredients. The later-described first layer may or need not contain other ingredient than the above-described ingredients. The later-described second layer may or need not contain other ingredient than the above-described ingredients. The later-described third layer may or need not contain other ingredient than the above-described ingredients.

Examples of other ingredients include a heat shielding substance other than ITO particles (X), a metal salt, an ultraviolet shielding agent, an oxidation inhibitor, a coupling agent, a surfactant, a fire retardant, an antistatic agent, an adhesion adjusting agent other than metal salt, a moisture-proofing agent, a fluorescent brightener, and an infrared absorber, and the like. One kind of the other ingredient may be used alone, and two or more kinds thereof may be used in combination.

<Heat Shielding Substance Other than ITO Particles (X)>

Examples of the heat shielding substance other than ITO particles (X) include a heat shielding compound, heat shielding particles other than ITO particles (X), and so on. One kind of the heat shielding substance may be used alone, and two or more kinds thereof may be used in combination.

Examples of the heat shielding compound include a phthalocyanine compound, a naphthalocyanine compound, and an anthracyanine compound, and the like. Examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, tungsten oxide particles (sodium-doped tungsten oxide particles, cesium-doped tungsten oxide particles, thallium-doped tungsten oxide particles, rubidium-doped tungsten oxide particles), tin-doped indium oxide particles (ITO particles) other than ITO particles (X), tin-doped zinc oxide particles and silicon-doped zinc oxide particles, and lanthanum hexaboride ($LaB_6$) particles, and the like.

<Metal Salt>

Examples of the metal salt include alkali metal salts and alkali earth metal salts and the like. It is preferred that the interlayer film contain at least one kind of metal salt (hereinafter, sometimes described as Metal salt M) of alkali metal salts and alkali earth metal salts. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba, and it is more preferred that the Metal salt M contain at least one kind of metal of K or Mg.

<Ultraviolet Ray Screening Agent>

By the use of the ultraviolet ray screening agent, the visible light transmittance becomes still less likely to decrease even when the interlayer film and the laminated glass are used for a long period. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

<Oxidation Inhibitor>

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom. One kind of the oxidation inhibitor may be used alone, and two or more kinds thereof may be used in combination.

(Other Details of Dispersion)

It is preferred that the dispersion be used as a mixture with a thermoplastic resin. It is preferred that the dispersion be used for obtaining a resin composition containing the dispersion and a thermoplastic resin. It is preferred that the dispersion be used for obtaining a material for an interlayer film for laminated glass.

(Other Details of Resin Composition)

The resin composition contains the above-described dispersion, and the thermoplastic resin. The resin composition can be suitably used as a material for an interlayer film for laminated glass. It is preferred that the resin composition be used for obtaining an interlayer film for laminated glass.

(Other Details of Interlayer Film)

The interlayer film includes a layer containing ITO particles (X). It is preferred that the interlayer film includes a layer containing ITO particles (X) and a thermoplastic resin. It is preferred that the interlayer film include a layer formed from the resin composition. It is preferred that the interlayer film includes layer X containing ITO particles (X) and a thermoplastic resin.

The interlayer film may be a single-layered interlayer film and may be a multi-layered interlayer film. The interlayer film may have a one-layer structure, may have a two-layer structure, may have a two or more-layer structure, may have a three-layer structure, may have a three or more-layer structure, and may have a four or more-layer structure. The interlayer film includes at least the first layer. The interlayer film having a two or more-layer structure includes the first layer, and the second layer. In this case, the second layer is arranged on a first surface side of the first layer. The interlayer film having a three or more-layer structure includes the first layer, the second layer, and the third layer. In this case, the second layer is arranged on the first surface side of the first layer, and the third layer is arranged on a second surface side opposite to the first surface of the first layer.

In the interlayer film, the first layer may be the layer X, the second layer may be the layer X, and the third layer may be the layer X. When the interlayer film includes a plurality of layers X, the layers X may have the same composition, or may have compositions that are different from each other.

When the interlayer film is a single-layered interlayer film including only the first layer, the first layer is the layer X.

When the interlayer film is a multi-layered interlayer film including the first layer and the second layer, the first layer may be a layer containing ITO particles (X) and a thermoplastic resin, and may be a layer formed from the resin composition containing the dispersion and the thermoplastic resin. When the interlayer film is a multi-layered interlayer film including the first layer and the second layer, the second layer may be a layer containing ITO particles (X) and a thermoplastic resin, and may be a layer formed from the resin composition containing the dispersion and the thermoplastic resin. When the interlayer film is a multi-layered interlayer film including the first layer, the second layer, and the third layer, the third layer may be a layer containing ITO particles (X) and a thermoplastic resin, and may be a layer formed from the resin composition containing the dispersion and the thermoplastic resin.

The layer X may be a surface layer or may be an intermediate layer in the interlayer film. The layer X may form a surface layer and an intermediate layer in the interlayer film.

FIG. 1 is a sectional view schematically showing an interlayer film for laminated glass in accordance with a first embodiment of the present invention.

The interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 includes a first layer 1, a second layer 2 and a third layer 3. The interlayer film 11 has a three-layer structure. The second layer 2 is arranged on a first surface 1*a* of the first layer 1 to be layered thereon. The third layer 3 is arranged on a second surface 1*b* opposite to the first surface 1*a* of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order. In the present embodiment, the second layer 2 and the third layer 3 are layers X containing ITO particles (X) and a thermoplastic resin.

In this connection, other layers may be arranged on the surface opposite to the first layer 1 of the second layer 2, and on the surface opposite to the first layer 1 of the third layer 3, respectively. Also, both of the second layer 2 and the third layer 3 do not contain ITO particles (X), and the first layer 1 may be the layer X containing ITO particles (X) and a thermoplastic resin. Also, the first layer 1, the second layer 2, and the third layer 3 may be the layers X containing ITO particles (X) and a thermoplastic resin.

FIG. 2 is a sectional view schematically showing an interlayer film for laminated glass in accordance with a second embodiment of the present invention.

The interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass. The interlayer film 11A which is the first layer is a layer X containing ITO particles (X) and a thermoplastic resin.

The average thickness of the interlayer film is not particularly limited. From the viewpoint of the practical aspect and the viewpoint of sufficiently enhancing the penetration resistance and the flexural rigidity of laminated glass, an average thickness of the interlayer film is preferably 0.1 mm or more, more preferably 0.25 mm or more, and is preferably 3 mm or less, more preferably 1.5 mm or less. When the thickness of the interlayer film is the aforementioned lower limit or more, the penetration resistance and the flexural rigidity of laminated glass are further enhanced. When the thickness of the interlayer film is the aforementioned upper limit or less, the transparency of the interlayer film and the laminated glass is further improved.

An average thickness of the interlayer film is defined as T.

The intermediate layer of the interlayer film may be a layer containing ITO particles (X), may be the layer X, and may be a layer not containing ITO particles (X). The average thickness of the intermediate layer is preferably 0.005 T or more, more preferably 0.01 T or more, further preferably 0.02 T or more, and is preferably 0.17 T or less, more preferably 0.15 T or less, still more preferably 0.13 T or less, more preferably 0.1 T or less, further preferably 0.09 T or less. In the interlayer film having a multilayer structure of second layer/first layer/third layer, an average thickness of the first layer is preferably 0.005 T or more, more preferably 0.01 T or more, further preferably 0.02 T or more. In the interlayer film having a multilayer structure of second layer/first layer/third layer, an average thickness of the first layer is preferably 0.17 T or less, more preferably 0.15 T or less, more preferably 0.13 T or less, more preferably 0.1 T or less, further preferably 0.09 T or less. When the average thickness of the first layer is the aforementioned lower limit or more and the aforementioned upper limit or less, the sound insulating property is further enhanced in a wide range of temperature.

The surface layer of the interlayer film may be a layer containing ITO particles (X), may be the layer X, and may be a layer not containing ITO particles (X). The average thickness of the surface layer is preferably 0.005 T or more, more preferably 0.01 T or more, further preferably 0.02 T or more, and is preferably 0.17 T or less, more preferably 0.15 T or less, still more preferably 0.13 T or less, more preferably 0.1 T or less, further preferably 0.09 T or less. In the interlayer film having a multilayer structure of second layer/first layer/third layer, an average thickness of the second layer is preferably 0.005 T or more, more preferably 0.01 T or more, further preferably 0.02 T or more. In the interlayer film having a multilayer structure of second layer/first layer/third layer, an average thickness of the second layer is preferably 0.17 T or less, more preferably 0.15 T or less, more preferably 0.13 T or less, more preferably 0.1 T or less, further preferably 0.09 T or less. In the interlayer film having a multilayer structure of second layer/first layer/third layer, an average thickness of the third layer is preferably 0.005 T or more, more preferably 0.01 T or more, further preferably 0.02 T or more. In the interlayer film having a multilayer structure of second layer/first layer/third layer, an average thickness of the third layer is preferably 0.17 T or less, more preferably 0.15 T or less, more preferably 0.13 T or less, more preferably 0.1 T or less, further preferably 0.09 T or less. When the average thicknesses of the second layer and the third layer are the aforementioned lower limit or more and the aforementioned upper limit or less, the sound insulating property is further enhanced in a wide range of temperature.

The interlayer film may be an interlayer film having a uniform thickness, or may be an interlayer film having varying thickness. The sectional shape of the interlayer film may be a rectangular shape and may be a wedge-like shape.

The interlayer film may be wound to be formed into a roll body of the interlayer film. The roll body may include a winding core and an interlayer film wound on the outer periphery of the winding core.

The distance between one end and the other end of the interlayer film is preferably 0.5 m or more, more preferably 0.8 m or more, especially preferably 1 m or more, and is preferably 3 m or less, more preferably 2 m or less, especially preferably 1.5 m or less.

The method for producing the interlayer film is not particularly limited. The interlayer film can be produced, for example, by using a resin composition obtained by mixing the dispersion and the thermoplastic resin. In the case of a single-layered interlayer film, examples of the production method of the interlayer film according to the present invention include a method of extruding a resin composition with an extruder, and a method of hot press molding. As a method for producing the interlayer film according to the present invention, a method of separately forming resin compositions used for constituting respective layers into respective layers, and then layering the obtained layers, and a method of coextruding resin compositions used for constituting respective layers with an extruder to layer the layers can be recited in the case of a multi-layered interlayer film.

For the reason of excellent production efficiency of the interlayer film, it is preferred that two surface layers contain the same polyvinyl acetal resin. For the reason of excellent production efficiency of the interlayer film, it is more preferred that two surface layers contain the same polyvinyl acetal resin and the same plasticizer. For excellent production efficiency of the interlayer film, it is further preferred that the two surface layers be formed of the same resin composition. In the interlayer film having a multilayer structure of second layer/first layer/third layer, it is preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calendar roll method, and a profile extrusion method, and the like. The emboss roll method is preferred because a large number of embosses of the protrusions and recesses, which is a quantitatively constant protrusions and recesses pattern, can be formed.

(Laminated Glass)

The laminated glass according to the present invention includes a first lamination glass member, a second lamination glass member and the aforementioned interlayer film for laminated glass. In the laminated glass according to the present invention, the above-mentioned interlayer film for laminated glass is arranged between the first lamination glass member and the second lamination glass member.

FIG. 3 is a sectional view schematically showing an example of laminated glass prepared with the interlayer film for laminated glass shown in FIG. 1.

A laminated glass 31 shown in FIG. 3 includes a first lamination glass member 21, a second lamination glass member 22 and the interlayer film 11. The interlayer film 11 is arranged between the first lamination glass member 21 and the second lamination glass member 22 to be sandwiched therebetween.

The first lamination glass member 21 is layered on a first surface 11*a* of the interlayer film 11. The second lamination glass member 22 is layered on a second surface 11*b* opposite to the first surface 11*a* of the interlayer film 11. The first lamination glass member 21 is layered on an outer surface 2*a* of the second layer 2. The second lamination glass member 22 is layered on an outer surface 3*a* of the third layer 3.

FIG. 4 is a sectional view schematically showing an example of laminated glass prepared with the interlayer film for laminated glass shown in FIG. 2.

A laminated glass 31A shown in FIG. 4 includes the first lamination glass member 21, the second lamination glass member 22 and the interlayer film 11A. The interlayer film 11A is arranged between the first lamination glass member 21 and the second lamination glass member 22 to be sandwiched therebetween.

The first lamination glass member 21 is layered on the first surface 11Aa of the interlayer film 11A. The second lamination glass member 22 is layered on a second surface 11Ab opposite to the first surface 11Aa of the interlayer film 11A.

It is preferred that the first lamination glass member be the first glass plate. It is preferred that the second lamination glass member be the second glass plate.

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, more preferably 3 mm or less. Moreover, when the lamination glass member is a glass plate, the thickness of the glass plate is preferably 0.5 mm or more, more preferably 0.7 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70° C. to 110° C. to obtain a laminate. Next, by putting the laminate into an autoclave or by pressing the laminate, the members are press-bonded together at about 120° ° C. to 150° C. and under a pressure of 1 MPa to 1.5 MPa. In this way, laminated glass can be obtained. At the time of producing the laminated glass, layers in the interlayer film may be laminated.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard resin, to the polyvinyl acetal the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials were prepared.

(ITO Particles)

ITO particles (X1) (average particle diameter: 55 nm, crystal lattice constant: 10.13 Å)

ITO particles (X2) (average particle diameter: 45 nm, crystal lattice constant: 10.13 Å)

ITO particles (X3) (average particle diameter: 35 nm, crystal lattice constant: 10.12 Å)

ITO particles (Y1) (average particle diameter: 65 nm, crystal lattice constant: 10.11 Å)

Average particle diameter and crystal lattice constant of each kind of ITO particles are values measured by the methods described above.

(Plasticizer)

Triethylene glycol di-2-ethylhexanoate (3GO)

(Organic Solvent)

Ethanol (Dispersion Stabilizer)

Polyoxyethylene nonyl phenyl ether phosphate (Thermoplastic Resin)

Polyvinyl acetal resin (PVB, average polymerization degree: 1700, content of hydroxyl group: 30% by mole, acetylation degree: 1% by mole, acetalization degree: 69% by mole)

Example 1

(1) Preparation of Dispersion

The following ingredients were mixed, and a dispersion was prepared using a beads mill.

ITO particles (X1): 100 parts by weight

3GO: 125 parts by weight

Ethanol: 12.5 parts by weight

Polyoxyethylene nonyl phenyl ether phosphate: 10 parts by weight (2) Preparation of Resin Composition The following ingredients were mixed, and kneaded sufficiently with a mixing roll to prepare a resin composition.

PVB: 100 parts by weight

3GO: 40 parts by weight

Dispersion: 1.07 parts by weight

The obtained resin composition contains ITO particles (X1) in an amount that is to be 0.3% by weight in 100% by weight of the obtained interlayer film (first layer).

(3) Preparation of Interlayer Film for Laminated Glass

The obtained resin composition was extruded with an extruder to obtain a single-layered interlayer film for laminated glass (interlayer film) with 760 μm thick having only the first layer (layer X). The configuration of the obtained interlayer film is shown in Table 1.

(4) Preparation of Laminated Glass

The obtained interlayer film was cut into a size of 30 cm long×30 cm wide. Next, two sheets of green glass in conformity with JIS R3208 (30 cm long×30 cm wide×2 mm thick) was prepared. Between these two sheets of green glass, the obtained interlayer film was sandwiched and temporarily press-bonded by a vacuum bagging method. The temporarily press-bonded laminate was retained for 10 minutes in an autoclave at a temperature of 140° C. and a pressure of 1.3 MPa, and then the temperature was lowered to 50° ° C. to complete regular press-bonding to obtain a laminated glass.

Examples 2 to 11 and Comparative Examples 1 to 5

A dispersion, a resin composition, an interlayer film and a laminated glass were prepared in the same manner as in Example 1 except that the kind of ITO particles was changed as shown in Tables 1 to 3, the blending amount of ITO particles was changed so that the content in the obtained interlayer film was the content as shown in Tables 1 to 3. The organic solvent and the dispersion stabilizer that are not described in Table were used in the same blending amounts as those in Example 1.

(Evaluation)

(1) Wide-Angle X-Ray Scattering of ITO Particles

A sum total $I_t$ of integrated intensity of peaks in wide-angle X-ray scattering of ITO particles, integrated intensity $I_0$ of a peak of (222) plane, integrated intensity $I_a$ of a peak of (622) plane, and integrated intensity $I_b$ of a peak of (440) plane were determined by the method as described above. From the obtained each integrated intensity, integrated intensity ratio ($I_0/I_t$), integrated intensity ratio ($I_a/I_0$) and integrated intensity ratio ($I_b/I_0$) were calculated.

FIG. 5 is measurement data in wide-angle X-ray scattering of ITO particles (X1), ITO particles (X2) and ITO particles (X3).

(2) Yellow Index

The obtained laminated glass was placed parallel with the normal line of the light axis on the optical path between the light source and the integrating sphere at a position 13 cm distanced from the integrating sphere so that only the transmitted parallel light is received by the integrating sphere, and visible light transmittance was measured with a spectrophotometer ("U-4100" available from Hitachi High-Tech Corporation), and yellow index was calculated in accordance with JIS K7373. The smaller the value of yellow index, the less the yellowness, and excellent appearance is achieved.

[Criteria for Judgement in Yellow Index]

○: Yellow index of less than 1.0 x: Yellow index of 1.0 or more (3) $T_{550}/T_{1400}$

The obtained laminated glass was placed parallel with the normal line of the light axis on the optical path between the light source and the integrating sphere at a position 13 cm distanced from the integrating sphere so that only the transmitted parallel light is received by the integrating sphere, and transmittance was measured with a spectrophotometer ("U-4100" available from Hitachi High-Tech Corporation). Transmittance at a wavelength of 550 nm of laminated glass is denoted by $T_{550}$, and transmittance at a wavelength of 1400 nm of laminated glass is denoted by $T_{1400}$, and $T_{550}/T_{1400}$ (ratio of $T_{550}$ to $T_{1400}$) was calculated. The higher the $T_{550}$, the higher the transparency. The lower the $T_{1400}$, the higher the heat shielding property. Therefore, the higher the $T_{550}/T_{1400}$, the more both the transparency and the heat shielding property can be enhanced.

[Criteria for Judgment in $T_{550}/T_{1400}$]

○: $T_{550}/T_{1400}$ of more than 6.8 x: $T_{550}/T_{1400}$ of 6.8 or less (4) $T_{550}$/Infrared Shielding Rate

In the same manner as in the above "(3) $T_{550}/T_{1400}$", transmittance at a wavelength of 550 nm ($T_{550}$) of the obtained laminated glass was measured. Also, weighting factors at 780 nm to 2100 nm shown in the appendix table 2 of JIS R3106:1998 were normalized so that the sum total was 1 to give new weighting factors, and an infrared shielding rate of laminated glass was calculated as a sum total of the values obtained by multiplying the weighting factors by the obtained respective transmittances at 780 nm to 2100 nm. From $T_{550}$ infrared and shielding rate, $T_{550}$/infrared shielding rate (ratio of $T_{550}$ to infrared shielding rate) was calculated. The higher the $T_{550}$, the higher the transparency. The lower the infrared shielding rate, the higher the heat shielding property. Therefore, the higher the $T_{550}$/infrared shielding rate, the more both the transparency and the heat shielding property can be enhanced.

[Criteria for Judgement in $T_{550}$/Infrared Shielding Rate]

○: $T_{550}$/infrared shielding rate of more than 3.0 x: $T_{550}$/infrared shielding rate of 3.0 or less

Configurations of interlayer films and results are shown in the following Tables 1 to 3.

TABLE 1

| | | | | | Example 1 | Example 2 | Example 3 | Example 4 | Example 5 | Example 6 |
|---|---|---|---|---|---|---|---|---|---|---|
| Interlayer film | Thermoplastic resin | Kind | | | PVB | PVB | PVB | PVB | PVB | PVB |
| | | Content (parts by weight) | | | 100 | 100 | 100 | 100 | 100 | 100 |
| | Plasticizer | Kind | | | 3GO | 3GO | 3GO | 3GO | 3GO | 3GO |
| | | Content (parts by weight) | | | 40 | 40 | 40 | 40 | 40 | 40 |
| | ITO particles | Kind | | | ITO particles (X1) | ITO particles (X1) | ITO particles (X2) | ITO particles (X2) | ITO particles (X2) | ITO particles (X2) |
| | | Content (% by weight) | | | 0.3 | 0.5 | 0.3 | 0.5 | 0.7 | 0.9 |
| | | Integrated intensity | Sum total | It | 16692 | 16692 | 16704 | 16704 | 16704 | 16704 |
| | | | (222) plane | I0 | 6048 | 6048 | 6190 | 6190 | 6190 | 6190 |
| | | | (622) plane | Ia | 1976 | 1976 | 2082 | 2082 | 2082 | 2082 |
| | | | (440) plane | Ib | 2733 | 2733 | 2772 | 2772 | 2772 | 2772 |
| | | Integrated intensity ratio | | I0/It | 0.362 | 0.362 | 0.371 | 0.371 | 0.371 | 0.371 |
| | | | | Ia/I0 | 0.327 | 0.327 | 0.336 | 0.336 | 0.336 | 0.336 |
| | | | | Ib/I0 | 0.452 | 0.452 | 0.448 | 0.448 | 0.448 | 0.448 |
| Evaluation | Yellow index | | | | −1.0 | 0.3 | −1.8 | −0.9 | 0.0 | 0.8 |
| | | | | | ○ | ○ | ○ | ○ | ○ | ○ |
| | T550/T1400 | | | | 10.5 | 30.2 | 13.6 | 47.0 | 161.7 | 556.7 |
| | | | | | ○ | ○ | ○ | ○ | ○ | ○ |
| | T550/infrared shielding rate | | | | 3.38 | 3.84 | 3.52 | 4.05 | 4.55 | 5.04 |
| | | | | | ○ | ○ | ○ | ○ | ○ | ○ |

TABLE 2

8
9

| | | | | | Example 7 | Example 8 | Example 9 | Example 10 | Example 11 |
|---|---|---|---|---|---|---|---|---|---|
| Interlayer film | Thermoplastic resin | Kind | | | PVB | PVB | PVB | PVB | PVB |
| | | Content (parts by weight) | | | 100 | 100 | 100 | 100 | 100 |
| | Plasticizer | Kind | | | 3GO | 3GO | 3GO | 3GO | 3GO |
| | | Content (parts by weight) | | | 40 | 40 | 40 | 40 | 40 |
| | ITO particles | Kind | | | ITO particles (X3) | ITO particles (X3) | ITO particles (X3) | ITO particles (X3) | ITO particles (X3) |
| | | Content (% by weight) | | | 0.15 | 0.3 | 0.5 | 0.7 | 0.9 |
| | | Integrated intensity | Sum total | It | 16574 | 16574 | 16574 | 16574 | 16574 |
| | | | (222) plane | I0 | 6230 | 6230 | 6230 | 6230 | 6230 |
| | | | (622) plane | Ia | 2103 | 2103 | 2103 | 2103 | 2103 |
| | | | (440) plane | Ib | 2688 | 2688 | 2688 | 2688 | 2688 |
| | | Integrated intensity ratio | | I0/It | 0.376 | 0.376 | 0.376 | 0.376 | 0.376 |
| | | | | Ia/I0 | 0.338 | 0.338 | 0.338 | 0.338 | 0.338 |
| | | | | Ib/I0 | 0.431 | 0.431 | 0.431 | 0.431 | 0.431 |

TABLE 2-continued

| | | Example 7 | Example 8 | Example 9 | Example 10 | Example 11 |
|---|---|---|---|---|---|---|
| | | 8<br>9 | | | | |
| Evaluation | Yellow index | −2.9 | −2.7 | −2.4 | −2.1 | −1.8 |
| | | ○ | ○ | ○ | ○ | ○ |
| | T550/T1400 | 7.1 | 23.3 | 114.7 | 564.4 | 2777.2 |
| | | ○ | ○ | ○ | ○ | ○ |
| | T550/infrared shielding rate | 3.16 | 3.77 | 4.44 | 5.07 | 5.71 |
| | | ○ | ○ | ○ | ○ | ○ |

TABLE 3

| | | | | | Comparative Example 1 | Comparative Example 2 | Comparative Example 3 | Comparative Example 4 | Comparative Example 5 |
|---|---|---|---|---|---|---|---|---|---|
| Interlayer film | Thermoplastic resin | Kind | | | PVB | PVB | PVB | PVB | PVB |
| | | Content (parts by weight) | | | 100 | 100 | 100 | 100 | 100 |
| | Plasticizer | Kind | | | 3GO | 3GO | 3GO | 3GO | 3GO |
| | | Content (parts by weight) | | | 40 | 40 | 40 | 40 | 40 |
| | ITO particles | Kind | | | ITO particles (Y1) | ITO particles (Y1) | ITO particles (Y1) | ITO particles (Y1) | ITO particles (Y1) |
| | | Content (% by weight) | | | 0.15 | 0.3 | 0.5 | 0.7 | 0.9 |
| | | Integrated intensity | Sum total | It | 26329 | 26329 | 26329 | 26329 | 26329 |
| | | | (222) plane | I0 | 10006 | 10006 | 10006 | 10006 | 10006 |
| | | | (622) plane | Ia | 3020 | 3020 | 3020 | 3020 | 3020 |
| | | | (440) plane | Ib | 4017 | 4017 | 4017 | 4017 | 4017 |
| | | Integrated intensity ratio | | I0/It | 0.380 | 0.380 | 0.380 | 0.380 | 0.380 |
| | | | | Ia/I0 | 0.302 | 0.302 | 0.302 | 0.302 | 0.302 |
| | | | | Ib/I0 | 0.401 | 0.401 | 0.401 | 0.401 | 0.401 |
| Evaluation | Yellow index | | | | −0.6 | 0.6 | 2.1 | 3.5 | 5.0 |
| | | | | | ○ | ○ | x | x | x |
| | T550/T1400 | | | | 3.8 | 6.8 | 14.9 | 32.3 | 70.1 |
| | | | | | x | x | ○ | ○ | ○ |
| | T550/infrared shielding rate | | | | 2.94 | 3.37 | 3.79 | 4.16 | 4.53 |
| | | | | | x | ○ | ○ | ○ | ○ |

Evaluation was made for Example of a single-layered interlayer film including only a layer containing ITO particles (X). Also, in a multi-layered interlayer film including a layer containing ITO particles (X) and other layer, excellent results as with the single-layered interlayer film is obtained owing to the layer containing ITO particles (X).

EXPLANATION OF SYMBOLS

1: First layer
1*a*: First surface
1*b*: Second surface
2: Second layer
2*a*: Outer surface
3: Third layer
3*a*: Outer surface
11: Interlayer film
11A: Interlayer film (first layer)
11*a*, 11Aa: First surface
11*b*, 11Ab: Second surface
21: First lamination glass member
22: Second lamination glass member
31, 31A: Laminated glass

The invention claimed is:

1. A dispersion comprising:

tin-doped indium oxide particles having at least one configuration selected from the group consisting of a first configuration below, a second configuration below and a third configuration below; and a dispersion medium:

the first configuration: when a sum total of integrated intensities of peaks observed in wide-angle X-ray scattering of the tin-doped indium oxide particles is represented by $I_t$, and integrated intensity of a peak of (222) plane is represented by $I_0$, $I_0/I_t$ is less than 0.380, the second configuration: when integrated intensity of a peak of (222) plane observed in wide-angle X-ray scattering of the tin-doped indium oxide particles is represented by $I_0$, and integrated intensity of a peak of (622) plane is represented by $I_a$, $I_a/I_0$ is 0.31 or more, and the third configuration: when integrated intensity of a peak of (222) plane observed in wide-angle X-ray scattering of the tin-doped indium oxide particles is represented by $I_0$, and integrated intensity of a peak of (440) plane is represented by $I_b$, $I_b/I_0$ is 0.41 or more.

2. The dispersion according to claim 1, wherein the tin-doped indium oxide particles have the first configuration.

3. The dispersion according to claim 1, wherein the tin-doped indium oxide particles have the second configuration.

4. The dispersion according to claim 1, wherein the tin-doped indium oxide particles have the third configuration.

5. The dispersion according to claim 1, wherein the tin-doped indium oxide particles have at least two configurations selected from the group consisting of the first configuration, the second configuration, and the third configuration.

6. The dispersion according to claim 1, wherein the tin-doped indium oxide particles have the first configuration, the second configuration, and the third configuration.

7. The dispersion according to claim 1, further comprising a plasticizer.

8. The dispersion according to claim 7, wherein the plasticizer is an organic ester plasticizer.

9. The dispersion according to claim 1, wherein the dispersion medium includes an organic solvent, and the organic solvent includes alcohol.

10. The dispersion according to claim 9, wherein the alcohol is monohydric alcohol or dihydric alcohol.

11. The dispersion according to claim 1, further comprising a dispersion stabilizer.

12. The dispersion according to claim 11, wherein the dispersion stabilizer is a sulfate ester compound, a phosphate ester compound, ricinoleic acid, polyricinoleic acid, polycarboxylic acid, or a polyhydric alcohol surfactant.

13. The dispersion according to claim 1, wherein the tin-doped indium oxide particles have an average particle diameter of 10 nm or more and 100 nm or less.

14. The dispersion according to claim 1, wherein the tin-doped indium oxide particles have a crystal lattice constant of 10.11 Å or more and 10.16 Å or less.

15. A resin composition comprising:

the dispersion according to claim 1; and a thermoplastic resin.

16. An interlayer film for laminated glass, comprising a layer formed from the resin composition according to claim 15.

17. An interlayer film for laminated glass, comprising a layer X containing tin-doped indium oxide particles having at least one configuration selected from the group consisting of a first configuration below, a second configuration below, and a third configuration below, and a thermoplastic resin:

the first configuration: when a sum total of integrated intensities of peaks observed in wide-angle X-ray scattering of the tin-doped indium oxide particles is represented by $I_t$, and integrated intensity of a peak of (222) plane is represented by $I_0$, $I_0/I_t$ is less than 0.380, the second configuration: when integrated intensity of a peak of (222) plane observed in wide-angle X-ray scattering of the tin-doped indium oxide particles is represented by $I_0$, and integrated intensity of a peak of (622) plane is represented by $I_a$, $I_a/I_0$ is 0.31 or more, and the third configuration: when integrated intensity of a peak of (222) plane observed in wide-angle X-ray scattering of the tin-doped indium oxide particles is represented by $I_0$, and integrated intensity of a peak of (440) plane is represented by $I_b$, $I_b/I_0$ is 0.41 or more.

18. The interlayer film for laminated glass according to claim 17, wherein the tin-doped indium oxide particles have the first configuration.

19. The interlayer film for laminated glass according to claim 17, wherein the tin-doped indium oxide particles have the second configuration.

20. The interlayer film for laminated glass according to claim 17, wherein the tin-doped indium oxide particles have the third configuration.

21. The interlayer film for laminated glass according to claim 17, wherein the tin-doped indium oxide particles have at least two configurations selected from the group consisting of the first configuration, the second configuration, and the third configuration.

22. The interlayer film for laminated glass according to claim 17, wherein the tin-doped indium oxide particles have the first configuration, the second configuration, and the third configuration.

23. The interlayer film for laminated glass according to claim 17, wherein a content of the tin-doped indium oxide particles in the layer X is 0.1 parts by weight or more and 3 parts by weight or less per 100 parts by weight of the thermoplastic resin in the layer X.

24. The interlayer film for laminated glass according to claim 17, wherein the layer X further contains a plasticizer.

25. The interlayer film for laminated glass according to claim 24, wherein the plasticizer is an organic ester plasticizer.

26. The interlayer film for laminated glass according to claim 24, wherein a content of the plasticizer in the layer X is 20 parts by weight or more and 60 parts by weight or less per 100 parts by weight of the thermoplastic resin in the layer X.

27. The interlayer film for laminated glass according to claim 17, wherein the tin-doped indium oxide particles have an average particle diameter of 10 nm or more and 100 nm or less.

28. The interlayer film for laminated glass according to claim 17, wherein the tin-doped indium oxide particles have a crystal lattice constant of 10.11 Å or more and 10.16 Å or less.

29. A laminated glass comprising:

a first lamination glass member;

a second lamination glass member; and the interlayer film for laminated glass according to claim 16, the interlayer film for laminated glass being arranged between the first lamination glass member and the second lamination glass member.

* * * * *